July 21, 1970
W. R. SOOY
3,521,188
DOUBLE Q-SWITCHED LASER WITH SELF-MODE LOCKED
INTRACAVITY LOSS MODULATOR
Filed Oct. 19, 1966
3 Sheets-Sheet 1
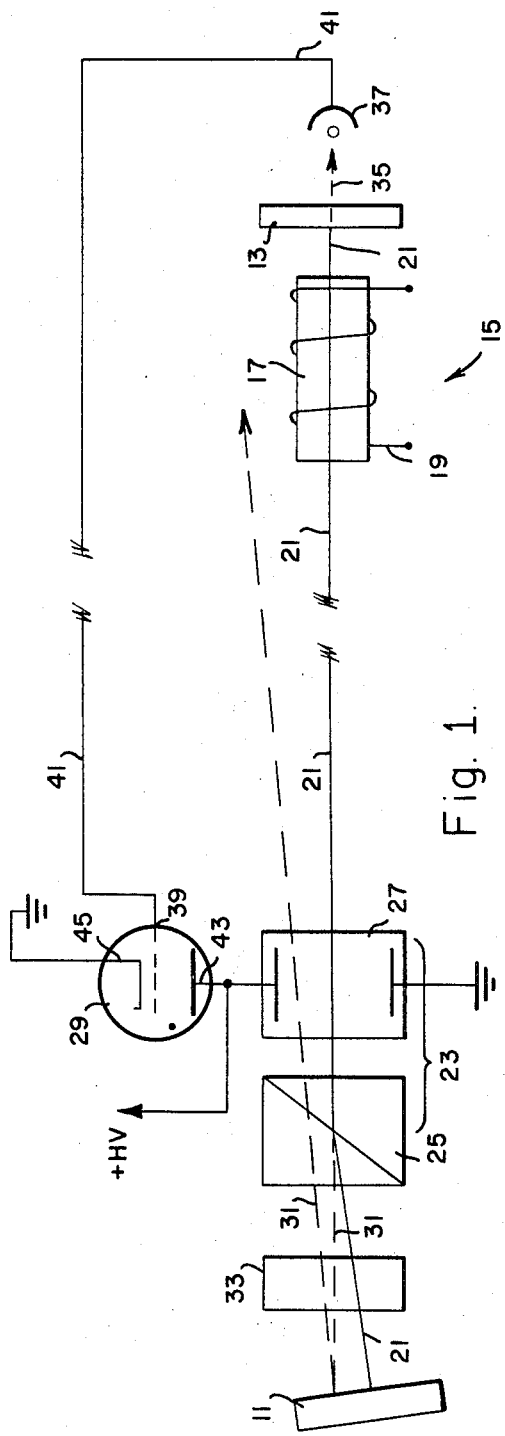
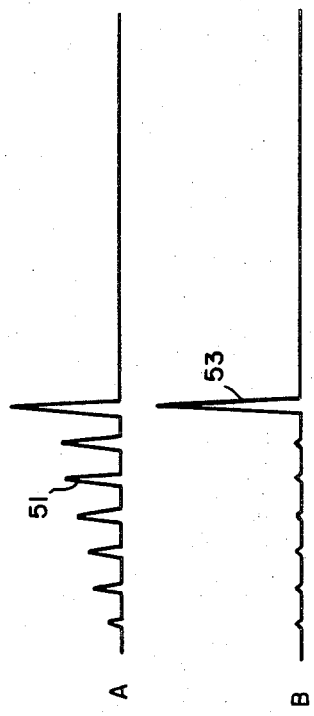
Walter R. Sooy,
INVENTOR.
BY
*J. K. Haskell*
ATTORNEY.

Walter R. Sooy,
INVENTOR.

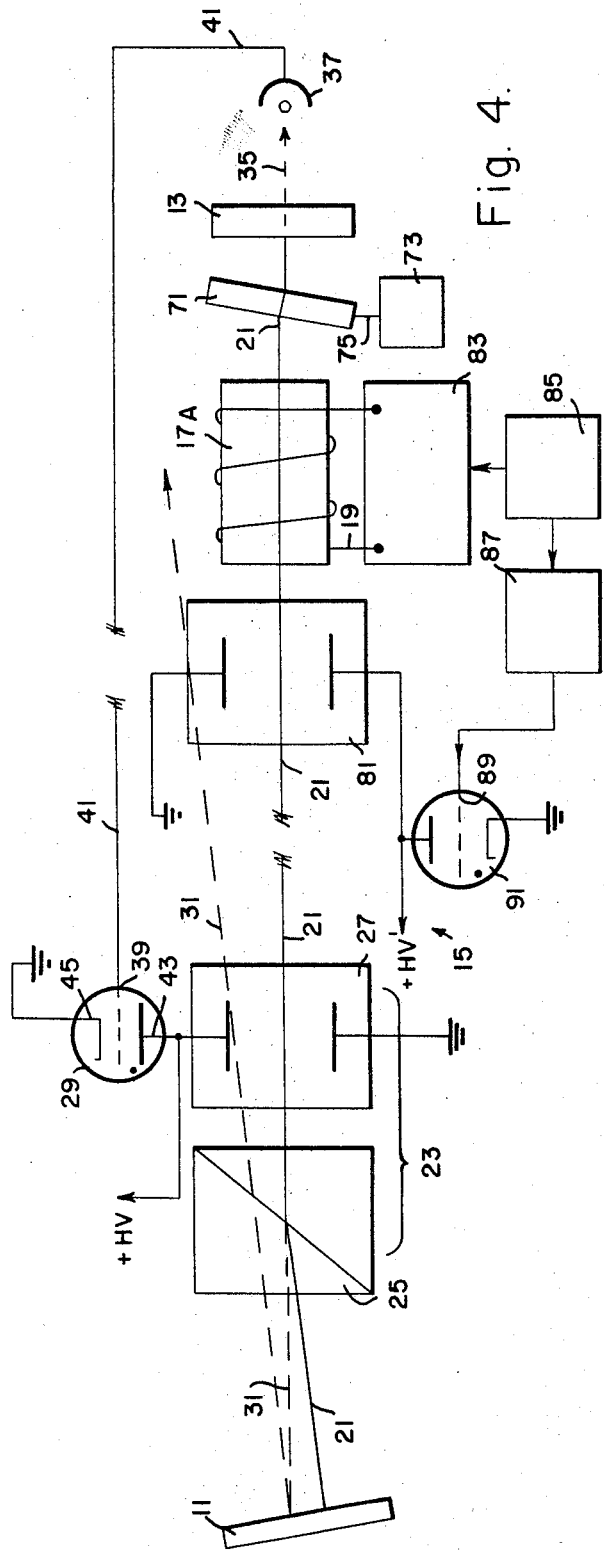
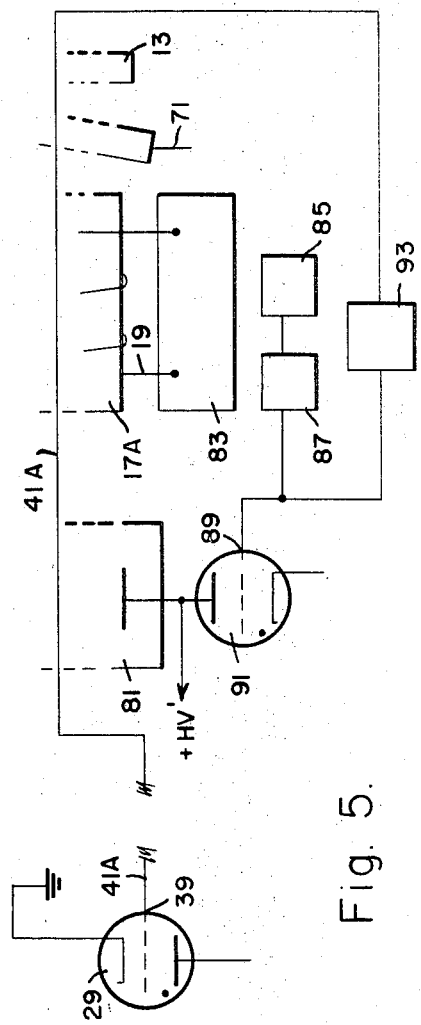
Fig. 4.
Fig. 5.
Walter R. Sooy,
INVENTOR.
BY
J. K. Haskell
ATTORNEY.

United States Patent Office 3,521,188
Patented July 21, 1970

3,521,188
DOUBLE Q-SWITCHED LASER WITH SELF-MODE LOCKED INTRACAVITY LOSS MODULATOR
Walter R. Sooy, Manhattan Beach, Calif., assignor to Hughes Aircraft Company, Culver City, Calif., a corporation of Delaware
Filed Oct. 19, 1966, Ser. No. 587,818
Int. Cl. H01s 3/11
U.S. Cl. 331—94.5        10 Claims

ABSTRACT OF THE DISCLOSURE

The invention is a laser having an excited active element disposed in the regenerative path of a regenerative laser cavity and also includes the function of two Q-switches and that of a self-mode locked intracavity loss modulator. One Q-switch holds back oscillation in the cavity until the active element is pumped to a highly inverted state at which time the modulator reacts with the circulating power to create sharp energy spikes of sub-nanosecond duration which build up to a predetermined magnitude. The other Q-switch then is operated to switch out of the cavity a single output pulse.

---

The generation of what are known as giant pulses is not new. This technique was first disclosed in 1961 by R. W. Hellwarth in "Advances in Quantum Electronics," Columbia University Press, New York, pp. 334–341, under the heading "control of fluorescent pulsations." The generation of these pulses was accomplished by using detached reflectors as the regenerative laser cavity wherein a ruby rod was disposed. A fast shutter was inserted in the regenerative path in the cavity between the ruby and one of the reflectors. By keeping the shutter closed while the ruby was pumped, excitation in the ruby was built up far above the level of threshold that would have been the case without the shutter. When a high excitation was reached, the shutter was opened which allowed the radiation to build up rapidly and the excess excitation be discharged in what was then considered to be an extremely short period of time (of the order of 20 nanoseconds). The intensity of the resulting short pulse exceeded that obtainable from shutterless ruby lasers by many orders of magnitude.

Although this breakthrough in providing an extremely high intensity short pulse of laser energy advanced the art a considerable degree, there are a great many applications where a very high intensity laser pulse having a much shorter duration than heretofore available would be very advantageous and would advance the art to even a greater degree. Such an application would be in the range measurements art, for example. It can easily be seen that the shorter the pulse the more resolution is provided in the ranging. For example, a sub-nanosecond pulse of sufficient magnitude can be used to determine the longitudinal extent of an object ranged by measuring the duration of a return pulse reflected by the object. Since standard giant pulse lasers are incapable of generating a pulse of such short duration, a sub-nanosecond giant pulse generator of the type to be herein described constitutes a very useful and advantageous device having many applications.

In contrast to the prior giant pulse laser art, the invention combines the effect of two specially timed Q-switches disposed in the regenerative path in a laser cavity and also the effect of what is known in the laser art as "intracavity modulation" in such a way that the output is a single ultra short pulse containing a large fraction of the available energy.

It is therefore an object of the present invention to provide an improved giant pulse laser.

It is another object of the invention to provide a laser capable of generating a high intensity laser pulse having a shorter pulse duration than heretofore available.

It is yet another object of this invention to provide a laser capable of generating a sub-nanosecond high intensity pulse useful for high resolution in ranging systems.

These and other objects of the invention are obtained in a sub-nanosecond giant pulse laser including a multimode active laser material disposed in a laser cavity having a regeneration path therein. Also included in this regeneration path is an intracavity loss modulator and switching means capable of two fast switching functions. With the regeneration path broken by the switching means, the laser material is pumped by an appropriate source of pump energy to a predetermined highly inverted state at which time the regeneration path is established. Due to the function of the intracavity loss modulator, the circulating power in the laser cavity is reduced to a series of sharp spikes of sub-nanosecond duration. These spikes greatly increase in intensity through Q-switching type action until a predetermined peak energy level is reached, at which time the switching means operates to break the regeneration path to stop laser action and to send a high intensity sub-nanosecond pulse out of the laser cavity as an output pulse.

The invention and specific embodiments thereof will be described hereinafter by way of example and with reference to the accompanying drawings wherein like reference numerals refer to like elements or parts and in which:

FIG. 1 is a schematic diagram of a preferred embodiment of the invention;

FIG. 2 is a graph showing the build-up of sub-nanosecond pulses due to intracavity loss modulation and an output pulse generated by a laser constructed according to the invention;

FIG. 4 illustrates an embodiment of the invention wherein two separate electro-optic shutters are triggered by a photocell; and FIG. 5 shows how the triggering circuitry of the embodiment of FIG. 4 may be modified.

Figure 3:
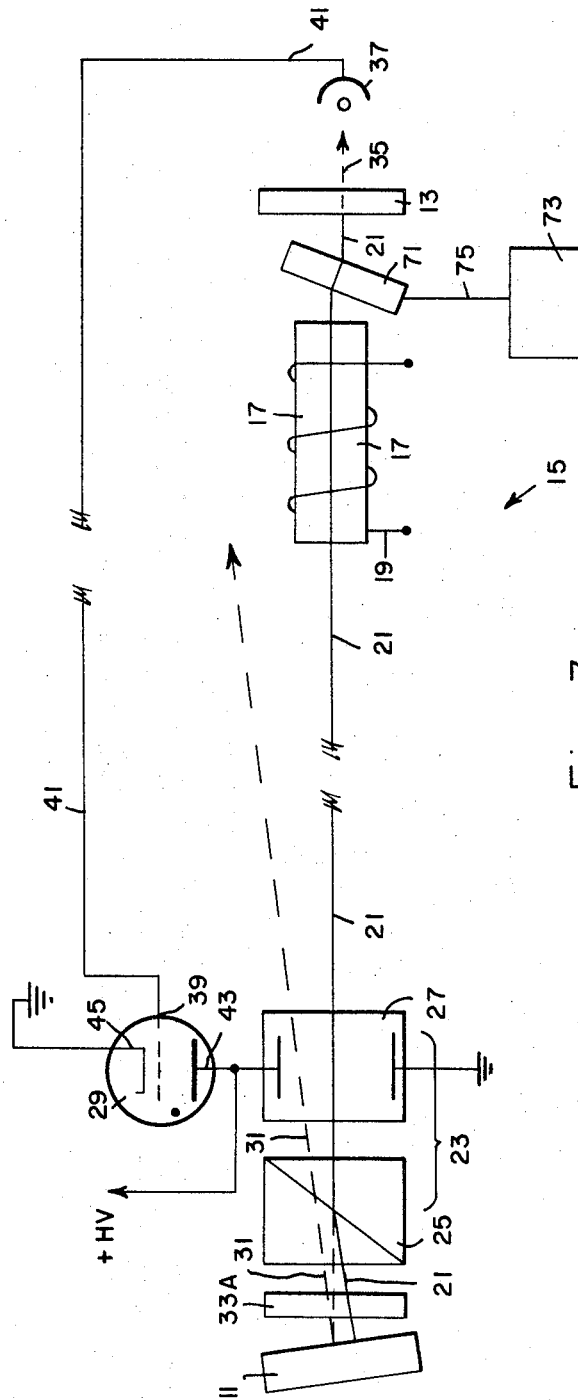
FIG. 3 is a schematic drawing of an embodiment of the invention utilizing a separate loss modulator element.

With reference now to the drawings and more particular to FIG. 1, there is shown a pair of nominally 100% reflective mirrors 11 and 13 which define a resonant laser cavity 15 therebetween. An active laser material 17 having multimode charatceristics such as, for example, pink ruby or neodymium glass is positioned within the laser cavity 15. The laser material 17 is provided with a pump excitation source 19 which is shown as a helical flash lamp but which, of course, may in the case of a solid-state laser be a linear flash lamp and in the case of gaseous laser material be electrodes connected to a source of RF energy, etc. The pump exicitation source 19 is connected to a power supply not shown in this figure, and when the laser material 17 is excited to an inverted state, regenerative energy will circulate within the resonant cavity 15 generally, for purpose of explanation, along the solid line 21 when there is nothing present to interrupt this regenerative path. Disposed along the regenerative path 21 is a Q-switch 23 comprising a polarization sensitive deflective device 25 such as a Wollaston or Rochon prism, for example, adjacent an electro-optic cell 27 such as a Kerr or Pockels cell, for example. The electro-optic cell 27 and the polarization sensitive deflective device 25 are orientated in such a way that when a high energy potential +HV (half-wave voltage) is applied across the terminals of the cell 27, deflection takes place as can be seen by the curve in the regenerative path 21 within the deflecting device 25. However, when the potential is removed from the cell 27, as by firing a grid-controlled thyratron 29 to short out the potential supply, for example, there is no deflection force present and oscillatory light energy traveling through the Q-switch 23 toward the mirror 11 will follow generally the undeflected path denoted by dashed lines 31. This nondeflected energy is incident on the mirror 11 at such an angle that the reflected light energy will leave the resonant cavity 15 as an output signal.

Also positioned in the regenerative path 21 is what is commonly known as a passive Q-switch (PQS) 33. For best results, it should be located adjacent one of the mirrors and is shown adjacent the mirror 11. The PQS 33 may be comprised of cryptocyanine in methanol ($-15\%$ absorption in 3 mm.) which will bleach to allow passage therethrough of oscillatory light energy when a predetermined energy level is attained, as will be explained later.

In operation, initially a half-wave voltage is applied to the cell 27 and the laser material 17 is pumped to a highly inverted state by the pump source 19. Up to this point, there is very little or no oscillation because the PQS 33 acts as an opaque window until a certain energy level is reached. This level will be exceeded when the laser material 17 reaches a highly inverted state at which time this light intensity operated switch allows oscillatory energy to travel along the regenerative path 21. Once oscillations take place, the PQS 33 operates as a self-mode locked intracavity loss modulator which operate to introduces a loss term oscillating at the intermode spacing (i.e., the loss goes to zero at intervals equal to the loop transit time). This has the effect of reducing the circulating power in the laser to a sharp spike which is timed to pass through the loss modulator at its moment of minimum loss.

A very small amount of energy, shown by dashed line 35, passes through the mirror 13. This leakage output from the laser during the oscillatory build-up stage will then be a series of sharp (sub-nanosecond) spikes of increasing amplitude separated by the oscillatory loop transmit time.

When the circulating pulse amplitude is at its peak, as indicated by a monitor 37 positioned in the path of the leakage output 35, the thyratron 29 is triggered by the increasing signal from the monitor coupled to its control grid 39 by lead 41. The ignition of the gas in the thyratron 29 in effect places the high potential supply +HV connected to its anode terminal 43 at the same potential as its cathode electrode 45, which here is ground. This is a very fast process and with the potential removed from the electro-optic cell 27, the output coupling along the path 31 is rapidly switched from zero to 100%. This results in a single spike output and the laser action will immediately terminate.

A graphical representation of a sub-nanosecond spike build-up 51 can be seen at part A of FIG. 2, while a single high intensity spike output 53 is shown at part B of FIG. 2.

In the embodiment of FIG. 1, the PQS 33, as indicated, has two important functions. These functions utilize different physical properties of the material making up the switch. The first function is acting as a switch to delay regeneration until the laser material has become highly inverted. An explanation of this particular phenomenon has been described, for example, in the Journal of Applied Physics, vol. 35, 1964, p. 2551 in an article by B. H. Soffer. The second function of this PQS is to act as a self-mode locking element. This latter function, as already briefly described, provides spaced sub-nanosecond pulses as will be explained in more detail below.

Mode locking or mode coupling in lasers results from a time-varying loss within the laser resonant cavity or from the nonlinear characteristics of the inverted population. The results of such operation is that a laser incorporating this type of intracavity modulator operates as a pulse regenerative oscillator that produces a periodic train of sub-nanosecond width pulses. A more complete explanation of this phenomenon can be obtained by referring to an article entitled "Characteristics of Mode-Coupled Lasers" by M. H. Crowell in the IEEE Journal of Quantum Electronics, April 1965, pp. 12–20. The type of intracavity modulation shown in the Crowell article requires an external source of excitation, usually an RF generator operating somewhere in the range of 100 to 200 mc., depending on the cavity length and other factors more fully explained in the article.

The self-mode locking feature of the preferred embodiment of FIG. 1 on the other hand does not require an external source of excitation. The self-mode locking effect in a passive Q-switched giant pulse laser as shown here has been found to be derived from the saturation properties of the PQS. Two adjacent longitudinal modes mix in the PQS to produce sidebands at the position of the next nearest mode, thus producing a phase relationship between modes that is required for mode locking. The passive Q-switch bleaches with laser field strength according to the relation $$\alpha = \alpha_0 \frac{1}{1+kE^2}$$

where $k$ is a constant which is characteristic of the dye used in the PQS, $\alpha$ is the power loss rate of the dye, $\alpha_0$ is the initial loss rate of the dye before bleaching takes place, and E is the total electric field present. During the early phase of the bleaching, the absorption varies as $kE^2$ or in other words, each mode sees an effective gain which is proportional to the square of the total electric field at the passive Q-switch. This average gain is highest if all the mode amplitudes have the phase relationship required for mode locking. This explanation, of course, presumes that the dye absorption coefficient can change fast enough to follow the beat frequency produced by two adjacent modes. For crypto-cyanine in methanol, the response time is known to be less than half the beat frequency period so that the dye will act as a partial mixing element.

The two distinct functions of the PQS 33 of FIG. 1 need not both be utilized. For example, the PQS may only function as a Q-switch and not as a loss modulator. A device of this type is shown in FIG. 3 where a passive Q-switch 33A is used solely for its Q-switching properties. A separate intracavity loss modulator 71 will then be required. It is placed in the regenerative path 21 and is excited by a separate source of RF energy 73 through a lead 75. The design and operation of this type of modulator is fully covered in the referenced article of M. H. Crowell. The other elements of the device are the same as the embodiment of FIG. 1 and it operates essentially in the same manner.

With reference to FIG. 4, there is shown still another embodiment of the invention. Here, a separate active Q-switch has replaced the passive Q-switch of the other embodiments. This active Q-switch utilizes the polarization sensitive properties of a solid-state active laser element 17A, such as ruby. This property of the ruby element 17A operates with an electro-optic cell 81 to prevent oscillation along the regenerative path 21 until the inverted state of the laser element 17A, when pumped by a pump energy source 19 connected to a power supply 83, reaches a predetermined level. This can be accomplished, as shown in this figure, by instigating a trigger signal generated by a trigger source 85. The trigger signal is coupled both to the power supply 83 to energize the pump energy source 19 and also to a conventional delay line 87 that has a delay of sufficient length to allow the ruby element 17A to reach a highly inverted state before the trigger signal reaches a control-grid element 89 of a grid-controlled thyratron 91. A positive trigger signal on the control grid 89 will, of course, cause the gas in the thyratron 91 to ignite and short out a second power supply +HV', thus interrupting the electric field in the electro-optic cell 81 to allow the regeneration in the laser cavity 15 to begin along the regenerative path 21.

The monitor 37 of the embodiment of FIG. 4 may be replaced by a timed system as shown in FIG. 5. The control grid 39 of the thyratron 29 is shown here connected by lead 41A to a second delay line 93 which in turn is connected to the output of the first mentioned delay line 87. Thus, after a predetermined interval of time after the firing of the thyratron 91 to cause the regeneration to start, the trigger signal reaches the control grid 39 of the other thyratron 29 to cause an output pulse to be switched out of the cavity along the output path 31.

The following specifications and components were used in constructing and operating the laser shown in FIG. 1:

active laser element 17—3" x ¼" ruby (0.04% doping)
electro-optic cell 25—Kerr cell operated at ½ wave retardation voltage of about 30 kv.
passive Q-switches 33—cryptocyanine in methanol (−15% absorption in 3 mm.)
monitor-detector 37—fast photodiode, operated at about 2200 volts and having ½ nanosecond response time
laser cavity 15—93 cm. length.

All component surfaces were antireflection coated. The train of sub-nanosecond pulses 51 were found to be spaced approximately 6 nanoseconds apart and the output pulse 53 had a width of less than 1 nanosecond and an intensity of ½ M watt.

From the foregoing, it can be seen that the invention provides an improved laser capable of generating a sub-nanoscend high intensity pulse that has many useful applications.

In practicing the invention, any active laser material having multimode characteristics may be used effectively and the physical state of the material is of no particular consequence. Any fast-acting Q-switch can be substituted for the particular types shown herein and the other elements of the invention may be replaced with components having similar characteristics.

It is intended that the foregoing disclosure and drawings shall be considered only as illustrations of the principles of this invention and not to be construed in a limiting sense.

What is claimed is:

1. A sub-nanosecond giant pulse laser comprising: a laser cavity having a regenerative path therein; multimode active laser material disposed within said laser cavity in said regenerative path; pumping means coupled to said laser material for pumping said material to a highly inverted state; intracavity loss modulator means disposed within said laser cavity in said regenerative path for reacting with circulating laser energy to produce a periodic train of sub-nanosecond width pulses; first switching means disposed in said regenerative path within said laser cavity for preventing laser energy from circulating along said regenerative path until said laser material is pumped to a highly inverted state by said pumping means; and second switching means disposed in said regenerative path within said laser cavity for stopping laser action and coupling out of said laser cavity a single one of said sub-nanosecond width pulses that have attained a predetermined intensity level.

2. A sub-nanosecond giant pulse laser comprising: a laser cavity having a regenerative path therein; multimode active laser material disposed within said laser cavity in said regenerative path; pumping means coupled to said laser material for pumping said material to a highly inverted state; means disposed within said laser cavity in said regenerative path, for reacting with circulating laser energy to produce a periodic train of sub-nanosecond width pulses, and for preventing laser energy from circulating along said regenerative path until said laser material is pumped to a highly inverted state by said pumping means; and means disposed in said regenerative path within said laser cavity for stopping laser action and coupling out of said laser cavity a single one of said sub-nanosecond width pulses that have attained a predetermined intensity level.

3. A sub-nanosecond giant pulse laser comprising: a laser cavity having a regenerative path therein; multimode active laser material disposed within said laser cavity in said regenerative path; pumping means coupled to said laser material for pumping said material to a highly inverted state; intracavity loss modulator means disposed within said laser cavity in said regenerative path for reacting with circulating laser energy to produce a periodic train of sub-nanosceend width pulses; and switching means disposed in said regenerative path within said laser cavity for preventing laser energy from circulating along said regenerative path until said laser material is pumped to a highly inverted state by said pumping means, and for stopping laser action and coupling out of said laser cavity a single one of said sub-nanosecond width pulses that have attained a predetermined intensity level.

4. A sub-nanosecond giant pulse laser comprising: a laser cavity having a regenerative path therein; multimode active laser material disposed within said laser cavity in said regenerative path; pumping means coupled to said laser material for pumping said material to a highly inverted state; a passive Q-switch disposed within said laser cavity in said regenerative path for reacting with circulating laser energy to produce a periodic train of sub-nanosecond width pulses and for preventing laser energy from circulating along said regenerative path until said laser material is pumped to a highly inverted state by said pumping means; and an active Q-switch disposed within said laser cavity for stopping laser action and coupling out of said laser cavity a single one of said sub-nanosecond width pulses that have attained a predetermined intensity level.

5. A sub-nanosecond giant pulse laser comprising: a laser cavity having a regenerative path therein; multimode active laser material disposed within said laser cavity in said regenerative path; pumping means coupled to said laser material for pumping said material to a highly inverted state; intracavity loss modulator means disposed within said laser cavity in said regenerative path for reacting with circulating laser energy to produce a periodic train of sub-nanosecond width pulses; and switching means including a passive Q-switch disposed in said regenerative path within said laser cavity for preventing laser energy from circulating along said regenerative path until said laser material is pumped to a highly inverted state by said pumping means, and including an active Q-switch for stopping laser action and coupling out of said laser cavity a single one of said sub-nanosecond width pulses that have attained a predetermined intensity level.

6. A sub-nanosecond giant pulse laser comprising: a laser cavity having a regenerative path therein; multimode active laser material disposed within said laser cavity in said regenerative path; pumping means coupled to said laser material for pumping said material to a highly inverted state; means including a passive Q-switch disposed within said laser cavity in said regenerative path for reacting with circulating laser energy to produce a periodic train of sub-nanosecond width pulses, and for preventing laser energy from circulating along said regenerative path until said laser material is pumped to a highly inverted state by said pumping means; and switching means including an energy sensing monitor optically coupled to energy circulating along said regenerative path for detecting the intensity level of said sub-nanosecond width pulses, and including an active Q-switch disposed in said regenerative path within said laser cavity and coupled to said monitor for stopping laser action and coupling out of said laser cavity a single one of said sub-nanosecond width pulses selected by said monitor.

7. A sub-nanosecond giant pulse laser comprising: a laser cavity having a regenerative path therein; multi-mode solid-state active laser material disposed within said laser cavity in said regenerative path; a pump flash lamp disposed adjacent said laser material; a passive Q-switch-loss modulator disposed within said laser cavity in said regenerative path; an active Q-switch including a polarization sensitive deflecting device and an adjacent electro-optic cell disposed within said laser cavity in said regenerative path; a monitor optically coupled to said regenerative path and adapted to generate a signal corresponding to the magnitude of laser energy circulating along said regenerative path; and a grid-controlled thyratron coupled to said monitor and to said electro-optic cell and responsive to said signal generated by said monitor to switch said electro-optic cell when said signal has reached a predetermined intensity level.

8. A sub-nanosecond giant pulse laser comprising: a laser cavity having a regenerative path therein; multi-mode solid-state active laser material disposed within said laser cavity in said regenerative path; a pump flash lamp disposed adjacent said laser material; a passive Q-switch disposed within said laser cavity in said regenerative path; an active Q-switch including a polarization sensitive deflecting device and an adjacent electro-optic cell disposed within said laser cavity in said regenerative path; a loss modulator disposed within said laser cavity in said regenerative path; a monitor optically coupled to said regenerative path and adapted to generate a signal corresponding to the magnitude of laser energy circulating along said regenerative path; and a grid-controlled thyratron coupled to said monitor and to said electro-optic cell and responsive to said signal generated by said monitor to switch said electro-optic cell when said signal has reached a predetermined intensity level.

9. A sub-nanosecond giant pulse laser comprising: a laser cavity having a regenerative path therein; multi-mode solid-state active laser material disposed within said laser cavity in said regenerative path; a pump flash lamp disposed adjacent said laser material; a first active Q-switch including a first electro-optic cell disposed within said laser cavity in said regenerative path and adjacent said laser material and adapted in conjunction with said laser material to prevent circulation of laser energy along said regenerative path until said cell is switched to a transmissive mode; triggering means coupled to said pump flash lamp for generating a triggering signal and instigating the pumping of said laser material by said flash lamp; switching means coupled to said triggering means and to said first electro-optic cell and responsive to said triggering signal for switching said cell to said transmissive mode at a predetermined time after the instigation of the pumping of said laser material; a second active Q-switch including a polarization sensitive deflecting device and a second electro-optic cell adjacent thereto and disposed within said laser cavity in said regenerative path; a loss modulator disposed within said laser cavity in said regenerative path; a monitor optically coupled to said regenerative path and adapted to generate a signal corresponding to the magnitude of laser energy circulating along said regenerative path; and a grid-controlled thyratron coupled to said monitor and to said second electro-optic cell and responsive to said signal generated by said monitor to switch said second electro-optic cell when said signal has reached a predetermined intensity level.

10. A sub-nanosecond giant pulse laser comprising: a laser cavity having a regenerative path therein; multi-mode solid-state active laser material disposed within said laser cavity in said regenerative path; a pump flash lamp disposed adjacent said laser material; a first active Q-switch including a first electro-optic cell disposed within said laser cavity in said regenerative path and adjacent said laser material and adapted in conjunction with said laser material to prevent circulation of laser energy along said regenerative path until said cell is switched to a transmissive mode; triggering means coupled to said pump flash lamp for generating a triggering signal and instigating the pumping of said laser material by said flash lamp; switching means coupled to said triggering means and to said first electro-optic cell and responsive to said triggering signal for switching said cell to said transmissive mode at a predetermined time after the instigation of the pumping of said laser material; a second active Q-switch including a polarization sensitive deflecting device and a second electro-optic cell adjacent thereto and disposed within said laser cavity in said regenerative path; a delay line coupled to said triggering means and adapted to delay said triggering signal passing therethrough; a loss modulator disposed within said laser cavity in said regenerative path; and a grid-controlled thyratron coupled to said delay line and to said second electro-optic cell and responsive to said delayed triggering signal to switch said second electro-optic cell when triggered by said delayed triggering signal.

References Cited

UNITED STATES PATENTS 3,423,695    1/1969    Boyden _____ 331—94.5

OTHER REFERENCES

Hook et al., Laser Cavity Dumping Using Time Variable Reflection, Applied Phys. Let., vol. 9, No. 3 (Aug. 1, 1966), pp. 125–127.

Stetser et al., Optical Spectra of Ultrasonic Optical Pulses Generated by Mode-Locked Glass:Nd. Lasers, Appl. Phys. Let., vol. 9, No. 3 (Aug. 1, 1966), pp. 118–120.

Hull, Combination Laser Q-Switch Using a Spinning Mirror and Saturable Dye, Appl. Optics, vol. 5, No. 8 (August 1966), pp. 1343 and 1342.

RONALD L. WIBERT, Primary Examiner

W. L. SIKES, Assistant Examiner

U.S. Cl. X.R.

350—160